US009962911B2

(12) United States Patent
Maziers et al.

(10) Patent No.: US 9,962,911 B2
(45) Date of Patent: *May 8, 2018

(54) MULTILAYER ROTATIONAL MOULDING

(75) Inventors: Eric Maziers, Seneffe (BE); Gregory O'Brien, Downingtown, PA (US); Bruce Clay, Boyertown, PA (US)

(73) Assignee: Total Research & Technology Feluy, Seneffe (BE)

( * ) Notice: Subject to any disclaimer, the term of this patent is extended or adjusted under 35 U.S.C. 154(b) by 416 days.

This patent is subject to a terminal disclaimer.

(21) Appl. No.: 13/458,047

(22) Filed: Apr. 27, 2012

(65) Prior Publication Data
US 2013/0011643 A1    Jan. 10, 2013

Related U.S. Application Data

(63) Continuation of application No. 10/535,959, filed as application No. PCT/EP03/13049 on Nov. 20, 2003, now abandoned.

(30) Foreign Application Priority Data

Nov. 21, 2002 (EP) .................................. 02079876

(51) Int. Cl.
 *B29C 41/04* (2006.01)
 *B29C 41/22* (2006.01)
 (Continued)

(52) U.S. Cl.
 CPC .............. *B32B 27/08* (2013.01); *B29C 41/04* (2013.01); *B32B 1/02* (2013.01); *B32B 27/32* (2013.01);
 (Continued)

(58) Field of Classification Search
 CPC ........ B65D 35/00; B65D 35/02; B32B 27/32; B32B 1/02; B32B 27/08; B32B 27/34;
 (Continued)

(56) References Cited

U.S. PATENT DOCUMENTS 3,542,912 A * 11/1970 Nungesser et al. ........... 264/241
3,669,827 A *  6/1972 Kolyer et al. ................. 156/332
(Continued)

FOREIGN PATENT DOCUMENTS

CA    1322798 C * 10/1993 .............. C08L 51/06
EP    1104788 A1    6/2001
(Continued)

OTHER PUBLICATIONS

Xanthos, M. and Todd, D. B. 2000. "Plastics Processing". Kirk-Othmer Encyclopedia of Chemical Technology.*
(Continued)

*Primary Examiner* — Lee E Sanderson
(74) *Attorney, Agent, or Firm* — Albert Shung (57) ABSTRACT

A multilayer article prepared by rotational moulding can include a layer A that is a polyolefin (PO) based layer prepared from PO and a functionalised polyolefin (FPO), or a PO grafter to a non-polyolefin (NPO) in the form of a block copolymer (PO-g-NPO). A layer B can be a PO that is dissimilar from layer A, an NPO, a mixture thereof, and optionally an FPO or a PO-g-NPO. A layer C can be dissimilar from layer A and similar to or dissimilar from layer B. Layer C can be adjacent to layer A and/or layer B, can have good adhesion to layer A and/or layer B, and is not a blend of layer A and layer B. A method of preparing the multilayer article can include rotational moulding.

2 Claims, 4 Drawing Sheets

(51) Int. Cl.
  *B32B 27/08* (2006.01)
  *B32B 27/32* (2006.01)
  *B32B 27/34* (2006.01)
  *B32B 1/02* (2006.01)
(52) U.S. Cl.
  CPC ........... *B32B 27/327* (2013.01); *B32B 27/34* (2013.01); *B32B 2250/03* (2013.01); *B32B 2262/0238* (2013.01); *B32B 2262/0261* (2013.01); *Y10T 428/1352* (2015.01); *Y10T 428/24967* (2015.01); *Y10T 428/3175* (2015.04); *Y10T 428/3192* (2015.04); *Y10T 428/31507* (2015.04); *Y10T 428/31533* (2015.04); *Y10T 428/31757* (2015.04); *Y10T 428/31797* (2015.04); *Y10T 428/31859* (2015.04); *Y10T 428/31913* (2015.04); *Y10T 428/31938* (2015.04)
(58) Field of Classification Search
  CPC ...... B32B 27/327; B65K 15/00; B65K 15/03; B29C 41/22; B29C 41/04; B29C 41/042; B29C 41/045; B29C 41/047; B29C 41/06; Y10T 428/31757; Y10T 428/1352; Y10T 428/24967; Y10T 428/31507; Y10T 428/31533; Y10T 428/3175; Y10T 428/31797; Y10T 428/31859; Y10T 428/31913; Y10T 428/3192; Y10T 428/31938
  USPC ................ 428/35.7, 476.3, 746.9, 46.9, 516; 264/255, 367, 310
  See application file for complete search history.

(56) References Cited

U.S. PATENT DOCUMENTS

| | | | | |
|---|---|---|---|---|
| 3,791,915 | A * | 2/1974 | Goehring | B32B 27/00 156/244.11 |
| 3,845,163 | A * | 10/1974 | Murch | 525/183 |
| 4,087,587 | A * | 5/1978 | Shida et al. | 428/500 |
| 4,302,511 | A * | 11/1981 | Tuller et al. | 428/412 |
| 4,404,325 | A * | 9/1983 | Mason | C08L 77/00 525/179 |
| 4,452,942 | A * | 6/1984 | Shida | B32B 15/08 525/193 |
| 4,487,885 | A * | 12/1984 | Adur et al. | 525/74 |
| 4,497,856 | A * | 2/1985 | Iwasawa et al. | 220/62.11 |
| 4,548,779 | A * | 10/1985 | Steinberg et al. | 264/255 |
| 4,678,834 | A | 7/1987 | Boivin et al. | |
| 4,737,547 | A | 4/1988 | White | |
| 4,767,547 | A | 8/1988 | Straathof et al. | |
| 4,868,052 | A * | 9/1989 | Guerdoux et al. | 428/336 |
| 5,312,658 | A * | 5/1994 | Griffith | 428/34.4 |
| 5,314,733 | A * | 5/1994 | Saito | B32B 27/32 220/562 |
| 5,358,682 | A * | 10/1994 | Rogerson | 264/265 |
| 5,620,711 | A | 4/1997 | Saito | |
| 5,681,899 | A * | 10/1997 | Wang | C08L 21/00 524/81 |
| 5,700,890 | A * | 12/1997 | Chou | C08F 8/44 526/266 |
| 5,728,423 | A * | 3/1998 | Rogerson | 427/231 |
| 6,124,400 | A * | 9/2000 | Chien | C08L 23/06 525/88 |
| 6,359,055 | B1 * | 3/2002 | Delannoy | C08L 77/00 524/514 |
| 6,413,602 | B2 * | 7/2002 | Siour et al. | 428/36.91 |
| 7,247,268 | B2 * | 7/2007 | Jousse et al. | 264/311 |
| 2001/0000037 | A1 * | 3/2001 | Robichaud | C08K 5/098 524/394 |
| 2002/0051891 | A1 * | 5/2002 | Le Roy et al. | 428/475.8 |
| 2002/0061981 | A1 * | 5/2002 | Donald et al. | 525/332.9 |
| 2002/0119272 | A1 * | 8/2002 | Ries | B32B 27/34 428/36.91 |
| 2003/0059606 | A1 * | 3/2003 | Iijima | B32B 7/12 428/343 |
| 2003/0161981 | A1 | 8/2003 | Jousse et al. | |
| 2003/0175457 | A1 * | 9/2003 | Jousse | B32B 27/08 428/36.7 |
| 2006/0051538 | A1 * | 3/2006 | Maziers | 428/35.7 |
| 2006/0269709 | A1 * | 11/2006 | Maziers | 428/35.7 |
| 2007/0254174 | A1 * | 11/2007 | O'Brien et al. | 428/500 |
| 2010/0252510 | A1 * | 10/2010 | Godsay | B01D 39/163 210/806 |

FOREIGN PATENT DOCUMENTS

| | | | | |
|---|---|---|---|---|
| GB | 1190379 | * | 5/1970 | |
| JP | 10087950 | A | 4/1998 | |
| JP | 11170441 | A | 6/1999 | |
| WO | WO 0218134 | A1 * | 3/2002 | ............... B32B 7/12 |
| WO | WO 0228959 | A1 * | 4/2002 | ........... C08G 81/028 |

OTHER PUBLICATIONS

Vaslie, Cornelia and Mihaela Pascu. Practical Guide to Polyethylene. Shrewsbury: RAPRA Technology, 2005, p. 32.*
Whelan, Tony. Polymer Technology Dictionary. London: Chapman & Hall, 1994, p. 341.*
Vasile, Cornelia. Handbook of Polyolefin. New York: Marcel Dekker, 2000, p. 642.*
Chanda, Manas et al. Plastic Technology Handbook, Boca Raton FL: CRC/Taylor & Francis, 2007, p. 4-74.*
Carraher, Charles E., and Raymond B. Seymour. Seymour/Carraher's Polymer Chemistry. New York: M. Dekker, 2003, p. 32.*
Valentas et al., Handbook of Food Engineering Practice. Boca Raton, FL:CRC, 1997, p. 310.*
Benedikt, George M., Metallocene-catalyzed Polymers: Materials, Properties, Processing & Markets, Norwich NY: Plastic Design Library, 1998, p. 169.*
Robertson, Gordon L., Food Packaging and Practice (3rd Edition), Taylor and Francis, 2013, p. 41.*
Surlyn resin Product Data Sheet from E.I. du Pont de Nemours and Company, Inc., available Nov. 7, 2014.*
Ellis, Bryan. Polymers: A Property Database, CRC Press, Boca Raton, FL, 2007.*
Martienssen, Werner, and Hans Warlimont. Springer Handbook of Condensed Matter and Materials Data. Berlin: Spring, 2005.*
Office Action issued in Canadian Application No. 2,506,478 dated Mar. 3, 2011 (4 pages).
Annechini D. et al., "Some New Results on Rotational Molding of Metallocene Polyethylenes" Jan. 1, 2001; Society of Plastics Engineers. Annual Technical Conference (Antec). Proceedings, Society of Plastics Engineers, US—vol. 1, pp. 1-5.

* cited by examiner

MULTILAYER ROTATIONAL MOULDING

CROSS-REFERENCE TO RELATED APPLICATIONS

This application is a continuation of application Ser. No. 10/535,959, filed on Mar. 20, 2006, which claims the benefit of International Application No. PCT/EP2003/013049, filed on Nov. 20, 2003, which claims priority from EP 0207986.5, filed Nov. 21, 2002.

This invention relates to the field of multilayer article prepared by rotational moulding.

Polyethylene represents more than 80% of the polymers used in the rotomoulding market. This is due to the outstanding resistance of polyethylene to thermal degradation during processing, to its easy grinding, good flowability, and low temperature impact properties.

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications from their whiteness in their natural state.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerization of these polymer alloys requires a complex catalyst system comprising organometallic catalyst precursors, cationic forming cocatalysts and cross-over agents.

It is thus desired to produce articles prepared with two or more layers of similar or dissimilar material in order to improve the final properties of the finished product. For example, it may be desirable to combine the good barrier and temperature stability of polyamide with the acceptable food contact and qualities of polyethylene, such as for example low cost and good impact at low temperature. It is known however that polyamide does not adhere to polyethylene and a bonding layer or cross-linking is therefore necessary in order to insure structural integrity.

There is thus a need to produce rotomoulded multilayer articles that do not suffer from these drawbacks.

It is an aim of the present invention to prepare rotomoulded articles having good adherence between layers of dissimilar material.

It is another aim of the present invention to prepare rotomoulded articles having good permeation resistance, and/or chemical resistance.

It is a further aim of the present invention to prepare rotomoulded articles having a good thermal stability at elevated temperatures.

It is yet another aim of the present invention to prepare rotomoulded articles that can easily be painted.

Accordingly, the present invention discloses a multilayer article prepared by rotational moulding that comprises:

a. a layer A that is a polyolefin (PO)-based layer prepared from a composition comprising:
   from 40 to 100 wt % of polyolefin (PO) or a mixture thereof and
   from 60 to 0 wt % of a functionalised polyolefin (FPO) or of a PO grafted to a non-polyolefin (NPO) in the form of a block copolymer (PO)g-NPO);
b. a layer B comprising:
   a PO that is dissimilar from that of layer A or a NPO or a mixture thereof;
   optionally a FPO or a (PO-g-NPO);
c. optionally a layer C prepared from a polymer that is dissimilar from that of layer A and that is similar to or dissimilar from that of layer B and is adjacent to layer A and/or layer B and, if present, is characterised in that it has good adhesion to layer A and/or to layer B and is not a blend of layer A and layer B.

In a preferred embodiment according to the present invention, adhesion between layer A and layer B is developed by the functional or grafted polyolefin present in either layer.

When using FPO, the NPO has reactive species for creating the bond. When using PO-g-NPO, the PO is compatible with the NPO section. For example, the PO-g-NPO can be a polyolefin-g-polyamide.

In a preferred embodiment according to the present invention, optional layer C, if present is adjacent to either layer A or layer B but not between layer A and layer B.

The outer layer which may be layer A or layer B comprises homopolymers or copolymers of ethylene and/or propylene, and/or polyamide, and/or functional fluoropolymer, and optionally a functionalised polyolefin. In this description, copolymers are prepared from one monomer and one or more comonomers.

Preferably, the composition of layer A comprises polyethylene (PE) or polypropylene (PP), said PE or PP being prepared with a Ziegler-Natta or a metallocene-based catalyst system.

The article may contain additional layers for which the adherence is provided by conventional methods such as for example by a bonding layer.

In a preferred embodiment according to the present invention, the composition of the first layer comprises from 70 to 98 wt % and more preferably from 80 to 95 wt % of polyethylene or isotactic polypropylene or syndiotactic polypropylene, and preferably from 30 to 2 wt % and more preferably from 20 to 5 wt % of functionalised polyolefin.

The present invention also discloses a process for preparing a multilayer rotomoulded articles by feeding in one shot all the material necessary for each one layer. Preferably, the outer layer is layer A and more preferably, it is prepared from polyethylene or polypropylene.

It has been observed that in the rotomoulding process, the particles having the smallest diameter (the fines) reach the walls of the mould in the shortest time. It is therefore possible to combine differences in resin morphology and in resin melting temperature to prepare a two-layer rotomoulded article in one shot.

In a more preferred embodiment according to the present invention, the article has two layers wherein the external layer and is a composition comprising polyethylene and a functionalised polyolefin and the internal layer comprises polyamide or polyvinylidene fluoride or fluoropolymers containing functional groups.

The present invention also discloses a one-shot process to prepare said two-layer article that comprises the steps of:
a) providing a polyethylene composition comprising from 70 to 98 wt % of polyethylene and from 30 to 2 wt % of functionalised polyethylene, said polyethylene composition having a melting point of less than 145° C.;
b) providing a polyamide or a polyvinylidene fluoride (PVDF) having a melting point of more than 145° C.;
c) physically mixing the two resins;
d) feeding the mix of step c) in the rotational moulder and keeping under rotation;
e) retrieving the rotomoulded article;
wherein the ratio DPE/DPA of the particle diameter of the polyethylene composition (DPE) to that of the polyamide or polyvinylidene fluoride DPA is at most 2:3 and the melting point of the polyethylene composition is at least 15° C. lower than that of the polyamide or polivinylidene fluoride.

Preferably, the melting point of the polyethylene composition is of at most 130° C. and the melting temperature of the polyamide or polivinylidene fluoride is of at least 155° C., more preferably of at least 175° C.

The resins can be used in three different forms:
pellets having a diameter of from 2 to 4 mm;
micro-pellets having a diameter of from 200 to 1500 microns;
powder having a diameter of from 100 to 1500 microns.
Preferably ratio DPE/DPA of the particle diameters is at most 0.5.

The polyethylene composition particles, having the smallest size and the lowest temperature, are first separated by particle size difference and adhere to the mould first at the lowest temperatures. Subsequently, when the first layer is completely formed, the temperature increases and the polyamide or polyvinylidene fluoride starts melting and adhering to the first layer.

In addition to temperature and granulometry, other rheological properties of the resins such as melt index and viscosity can be used to control the successive depositions.

The polypropylene of the first layer is a homopolymer or a random copolymer or a block copolymer or a heterogeneous two-phase copolymer of propylene preferably a metallocene-produced isotactic polypropylene miPP or a metallocene-produced syndiotactic polypropylene msPP.

The polyethylene of the first layer is typically a copolymer of ethylene. It may also be a foamed polyethylene or a cross-liked polyethylene. It may be prepared with a conventional Ziegler-Natta catalyst system. Preferably, it is prepared with a metallocene catalyst system comprising a metallocene component of the general formula:

$$R''_s(CpR_n)_g(CpR_n)MQ_{3-g} \quad (I)$$

wherein
each Cp is a substituted or unsubstituted cyclopentadienyl ring;
each R is the same or different and is hydrogen or a hydrocarbyl radical such as alkyl, alkenyl, aryl, alkylaryl or arylalkyl radical containing from 1 to 20 carbon atoms or two carbon atoms are joined together to form a C4-C6 ring;
R'' is a structural bridge between two Cp rings;
M is a metal Group IIIB, IVB, VB, or VIB of the Periodic Table;
Q is a hydrocarbyl radical such as aryl, alkyl, alkenyl, alkylaryl or arylalkyl radical having from 1 to 20 carbon atoms, a hydrocarboxy radical having from 1 to 20 carbon atoms or a halogen and can be the same or different from each other;
s is 0 or 1, g is 0, 1 or 2 and s is 0 when g is 0, n is 4 when s is 1 and n is 5 when s is 0.

By substituted, it is meant that any of the positions on the cyclopentadienyl derivative may comprise a substituent in place of a hydrogen atom. This may be either within the five-membered cyclopentadienyl ring or, if the ligand is for example an indenyl, a tetrahydroindenyl or a fluorenyl, this may be on a carbon atom in the ring system outside of the five-membered ring.

The type of bridge present between the ligands in the present catalyst component is not particularly limited. Typically R'' comprises an alkylidene group having from 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent on the bridge comprises a hydrocarbyl radical having at least one carbon, such as a substituted or unsubstituted ethylenyl radical, for example —CH$_2$—CH$_2$— (Et). Most preferably R'' is Et or Me$_2$Si.

Q is preferably a halogen and most preferably it is Cl.

M is preferably a metal Group VIB of the periodic Table, more preferably it is titanium, zirconium or hafnium.

The metallocene-based catalyst system may comprise several metallocene-based catalyst components. In addition to the above metallocene catalyst component, the metallocene-based catalyst system comprises one or more activating agents having an ionising action and capable of activating the metallocene catalyst components, such as for example an alumoxane or a boron-based catalyst activator.

In addition, one or more aluminium alkyl can optionally be used as cocatalyst(s).

The catalyst system may be immobilised on an inert support, particularly on a porous solid support. Preferably, the support material is an inorganic oxide in its finely divided form.

For polyethylene, preferably the metallocene catalyst component is based on a bis(n-butyl-cyclopentadienyl) or a bis(indenyl) ligand, more preferably on a bis(tetrahydroindenyl) ligand and most preferably, it is ethylene bis(tetrahydroindenyl) zirconium dichloride.

Polyethylene that can be used in the present invention typically have a density of from 0.910 to 0.960 g/cm$^3$ and a melt index MI2 of from 1 to 20 g/10 min. The density is measured at 23° C. following the method of standard test ASTM D 1505 and the melt flow index MI2 is measured following the method of standard test ASTM D 1238 at a temperature of 190° C. and under a load of 2.16 kg.

For syndiotactic polypropylene, a cyclopentadieny-fluorenyl ligand is preferred and for isotactic polypropylene, a bis-indenyl or a bis-tetrahydroindenyl is preferred.

Polypropylene that can be used in the present invention typically have a melt flow index MI2 of from 1.5 to 100 g/10 min. The melt flow index MI2 is measured following the method of standard test ASTM D 1238 at a temperature of 230° C. and under a load of 2.16 kg.

The polyamides that can be used in the present invention are the products of condensation:
of one or more amino acids such as aminocaproic acid, 7-aminoheptanoic acid, 11-aminoundecanoic acid and 12-aminododecanoic acid of one or more lactams such as caprolactam, oenantholactam and lauryllactam;
of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

As examples of polyamides, mention may be made of PA 6 and PA 6-6.

It is also advantageously possible to use copolyamides. Mention may be made of the copolyamides resulting from the condensation of at least two α,ω-aminocarboxylic acids or of two lactams or of one lactam and one α,ω-aminocarboxylic acid. Mention may also be made of the copolyamides resulting from the condensation of at least one α,ω-aminocarboxylic acid (or a lactam), at least one diamine and at least one dicarboxylic acid.

Advantageously, the copolyamide is chosen from PA 6/12 and PA 6/6-6.

Mixtures of polyamide and polyolefins can also be used as layer B. The polyamide is as disclosed hereabove. The polyolefin can be a functionalised or a non-functionalised polyolefin or can be a mixture of at least one functionalised and/or of at least one non-functionalised polyolefin.

A non-functionalised polyolefin is conventionally a homopolymer or copolymer of α-olefins or of diolefins such as, for example, ethylene, propylene, 1-butene, 1-octene or butadiene.

A functionalised polyolefin is a polyolefin grafted or copolymerised with a material that provides polarity and/or reactivity and it therefore depends upon the nature of the adjacent layers. It can be an α-olefin polymer containing reactive units (functionalities); such reactive units are acid, anhydride or epoxy functions. By way of example, mention may be made of the above polyolefins grafted or co- or terpolymerized with unsaturated epoxides such as glycidyl (meth)acrylate, or with carboxylic acids or the corresponding salts or esters such as (meth)acrylic acid or alternatively with anhydrides of carboxylic acids such as maleic anhydride.

More generally, amine terminated materials can also be used in layer B and they are preferably selected from polyamide diamine (PAdiNH$_2$). According to their process of manufacture and/or the chain limiter used, the polyamides may have excesses of acid or amine end groups or may even have a proportion of alkyl or other end groups, for example aryl or any other function, deriving from the structure of the limiter chosen. The excess of acid end groups derives from a diacid chain limiter. The excess of amine end groups derives from a diamine chain limiter. A primary amine chain limiter leads to a polyamide chain having an alkyl end and an amine end.

The name diamine polyamide, PAdiNH$_2$, refers to a polyamide which satisfies the following criteria:
- it has a certain amount of chains ending on both sides with an amine group (NH$_2$)
- the amount of chains ending on both sides with an amine group (NH$_2$) is greater than that of diacid chains (if any)
- the concentration of amine groups is greater overall than the concentration of acid groups
- a PAdiNH$_2$ is obtained by adding a diamine as chain limiter or, in the case of polyamides based on diamine and on diacid such as, for example, PA6-6, by adding more diamine comonomer than diacid comonomer.

The polyamides that can be used in layer B may also be impact-modified polyamides. Supple modifiers may be made, for example, of functionalised polyolefins, grafted aliphatic polyesters, optionally grafted copolymers containing polyether blocks and polyamide blocks, and copolymers of ethylene and of an alkyl (meth)acrylate and/or of a saturated vinylcarboxylic acid ester. The modifier may also be a polyolefin chain with polyamide grafts or polyamide oligomers thus having affinities with the polyolefins and the polyamides. The supple modifier may also be a block copolymer.

Foamed polyamides may also be used in layer B.

Layer B may further advantageously be prepared from polyurethane or from a composition comprising polyamide and ethylene/vinyl alcohol copolymers (EVOH), and more generally, from a composition comprising polyamide and a barrier layer.

The functionalised polyolefin is a polyolefin grafted with a material that provides polarity and/or reactivity and it therefore depends upon the nature of the adjacent layers. A general description has been disclosed in a previous paragraph. Among the preferred functionalised polyolefins, one can cite ethylene/vinyl acetate copolymers (EVA), ethylene/ acrylic ester copolymers such as methyl acrylate (EMA) or butyl acrylate (EBA), ethylene/acrylic ester/maleic anhydride (MAH) or glycidyl methacrylate (GMA) terpolymers, maleic anhydride grafted polyethylene, maleic anhydride grafted polypropylene, maleic anhydride grafted EVA or AMA, EVOH. Typical functionalised polyolefins are disclosed for example in EP-A-1104788, or in EP-A-1122060.

In the present invention, the polyolefin is preferably grafted with anhydride. Preferably the polyolefin is polyethylene or polypropylene, more preferably, it is polyethylene.

The composition of layer A comprising a functional polyolefin and a PO resin or a mixture of PO resins may either be prepared by physical mixing of the components or be provided as a powder blend of the components.

The other one or two layers are made from a material that is dissimilar from that of the first layer in order to provide complimentary properties. Preferably, it is a polyamide, a polypropylene or a polyvinyl chloride, a polyvinylidene fluoride or an ethylene-vinyl alcohol copolymer (EVOH).

In a preferred embodiment according to the present invention, the second layer is prepared from polyamide. Polyamide is known to provide barrier properties and the addition of a polyamide layer thus provides improved barrier properties to the structure. Depending upon the final application, the polyamide layer can be used as an inside layer to provide for example permeation resistance, or as an outside layer, with for example an inner layer allowing for food contact.

A polyamide (PA) layer also provides temperature stability at elevated temperatures of up to 115° C. For comparison, rotomoulded articles conventionally prepared with polyethylene exhibit temperature stability up to temperatures of at most 60° C.

A PA layer further provides good environmental stress crack resistance (ESCR).

A multilayer rotomoulded article prepared with a PA external layer can easily be painted.

When a good resistance to oxidation and/or acids is necessary, PA cannot be used; it is preferred to use polyvinylidene fluoride (PVDF) polymer or other fluoropolymer.

Polypropylene has an excellent stress crack resistance whereas polyethylene has an excellent impact resistance. It is thus advantageous to prepare a two-layer rotomoulded article having an internal polypropylene layer and an external polyethylene layer or vice versa if such properties are needed.

Polypropylene also has an excellent resistance to scratch.

The multilayer system is designed according to the desired properties of the final product and it may consist for example of:
  PA or foamed PA/PE or foamed PE or miPP or msPP composition,
  miPP/PE or miPP or msPP composition/PA, siPP/PE or foamed PE or miPP or msPP composition/PA or impact-modified PA, miPP/PE or miPP or msPP composition, PA or foamed PA/PE composition/polyamide, polyvnylidene fluoride (PVDF) or PVDT with functional group/PE or miPP or msPP composition, miPP or msPP or PE/pvdf with functional group or fluoropolymer with functional group-foamed or unfoamed, PA composition/PE or foamed PE or miPP or msPP, PE composition/polyurethane (PU) or foamed PU.

These represent only a small sample of all possible organisation of layers.

Other layers may be added either by repeating the present invention as many times as necessary and/or by using bonding layers where necessary.

The thickness of each layer is determined by the size of the final product, by the desired properties and by the cost: it can vary from 0.5 mm up to several cm.

The size of the rotomoulded articles varies from 0.5 L up to 50 m$^3$.

Multiple layers object can be prepared either by manual introduction of material during the moulding cycle or by the use of a drop-box.

Manual addition involves moving the mould from the oven, removing a vent tube or plug that creates an opening in the part and adding more material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

In either method, there are two critical factors:

the temperature at which the subsequent layer is added: it is critical for determining the wall thickness of the previous skin formed and how well the two layers may be bound together;

the time elapsed before addition of the subsequent layer of material: if the mould is at rest for too long, material that has already adhered to the wall may sag.

It is possible to reduce these problems by lowering the melt index of the first layer and/or by reducing the injection temperature of the next layer, and/or by cooling the mould slightly before injection or the next layer.

The cycle time necessary to produce multilayer rotomoulded articles depends upon the number of layers and upon the mass injected for each layer. Typically for a double skin article wherein each skin has a thickness of about 3 mm, the total cycle time is from 60 to 80 minutes.

Surprisingly, it has been observed that the cycle time for preparing a multilayer object by successive injections of the several materials is shorter than the cycle time for preparing a monolayer object of the same total thickness and prepared from any one of the several materials.

More surprisingly, it has been observed that water spray cooling can even further reduce the cycle time for producing a multilayer rotomoulded article without exhibiting the substantial deformation and shrinkage observed when water spray cooling is used for preparing single layer PE rotomoulded articles.

The present invention also discloses a process for preparing a two-layer rotomoulded article wherein layer A is the outer layer and is a polyethylene composition comprising PE and FPO or (PO-g-NPO) and wherein layer B is the inner layer and is polyamide or PVDF or fluoropolymer containing functional groups, said process comprising the steps of:

a) providing the polyethylene composition for layer A;
b) increasing the peak internal air temperature (PIAT) to a temperature that is from 15 to 50° C. higher than the melting temperature of the composition of layer A in order to fully melt said layer A;
c) adding the composition for layer B using a drop-box;
d) increasing the PIAT to a temperature that is superior to the melting temperature of the composition of layer B in order to fully melt said layer B;
e) cooling down with water spray in order to solidify the resins;
f) retrieving the rotomoulded article.

The present invention is particularly useful for preparing fuel tanks for cars and lorries with a size ranging from 40 L to 600 L and more generally for preparing complex structures.

The present invention is also useful for preparing containers for transporting nitric acid or other chemicals when the internal layer is prepared with polyvinylidene fluoride.

EXAMPLES

Several rotomoulded articles were prepared as follows.

All test mouldings were carried out on the ROTOSPEED rotational moulding machine. It is a carrousel-style machine with offset arm, LPG burner arm with a burner capacity of 523 kW/hr, air fan cooling, and/or water spray cooling and a maximum plate diameter of 1.5 m.

An aluminum box mould was used to produce the test mouldings. The mould was equipped with a draft angle to facilitate demoulding and the bi-layer articles were prepared by the use of a drop box. The drop box was filled with the material needed for the first layer and then attached to the lid of the mould. A pneumatic ram in the drop box held the material in place until the required temperature was reached, the ram was then activated and the material was dropped in. That operation was repeated for each layer under the conditions described below.

The tests were carried out on two types of material. The mould was removed from the oven at different peak internal temperatures. The moulding conditions for the trials were as follows:

oven temperature: 300° C.
rotation ratio: 4:1
cooling medium: forced air
preheated arm and mould
rotolog unit n°5/rotolog software version 2.7.

The shot sizes were respectively of 1.8 kg and 1.2 kg in order to produce skin thickness of respectively 3 mm and 2 mm.

All cycle times were taken from the same start and end points to allow for easier comparison of the various stages in the internal air temperature traces.

Example 1

Figure 1:
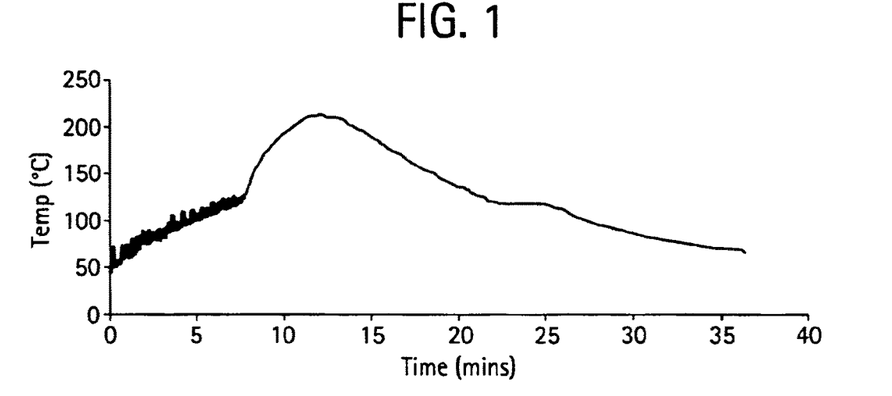
FIGS. 1 to 5 are respectively the rotolog traces of examples 1 to 4 and of example 7. They each represent the peak internal air temperature (PIAT) expressed in degrees centigrade as a function of the cycle time expressed in seconds.

A shot weight of 1.8 kg was used to produce a single skinned 3 mm thick moulding of a polyethylene composition consisting of 80 wt % of a polyethylene prepared with bis(n-butyl-cyclopentadienyl) zirconium dichloride and having a density of 0.940 g/cm$^3$ and a melt flow index MI2 of 9 g/10 min, and of 20 wt % of a polyethylene gradted with anhydride sold under the name OREVAC® by ATOFINA. A PIAT of 212° C. was achieved and the cycle time was 36.42 minutes. The rotolog trace is shown in FIG. 1.

Example 2

Figure 2:
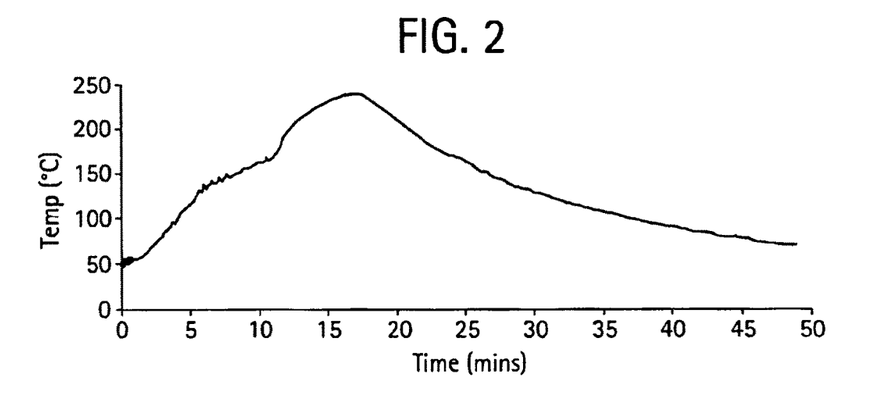

A shot weight of 1.85 kg was used to produce a 3 mm thick single skinned moulding of a PA-11 resin sold by ATOFINA under the name RILSAN®. As Nylon melts at a higher temperature than polyethylene, a PIAT of 239° C. was achieved and the cycle was completed in 48.9 minutes. The rotolog trace is shown in FIG. 2.

Example 3

A two skinned moulding was produced as follows:
a shot weight of 1.8 kg of the same polyethylene composition as in Example 1 was first dropped in the mould to constitute the outer layer;
a shot weight of 1.8 kg of the same PA-11 resin as in example 2 was dropped in at a temperature of 133° C. to produce the inner layer.

Figure 3:
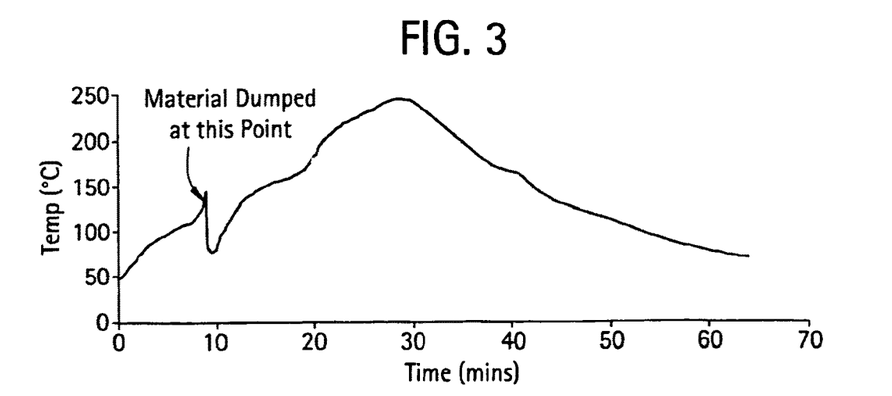

A PIAT of 245° C. was achieved and the cycle was completed in 63.7 minutes. The rotolog trace is shown in FIG. 3. The bond between the two layers was very good and no delamination was observed.

Example 4

The same two skinned moulding as that of Example 3 was used except that the temperature at which the PA-11 resin was dropped in was of 170° C. instead of 133° C.

Figure 4:
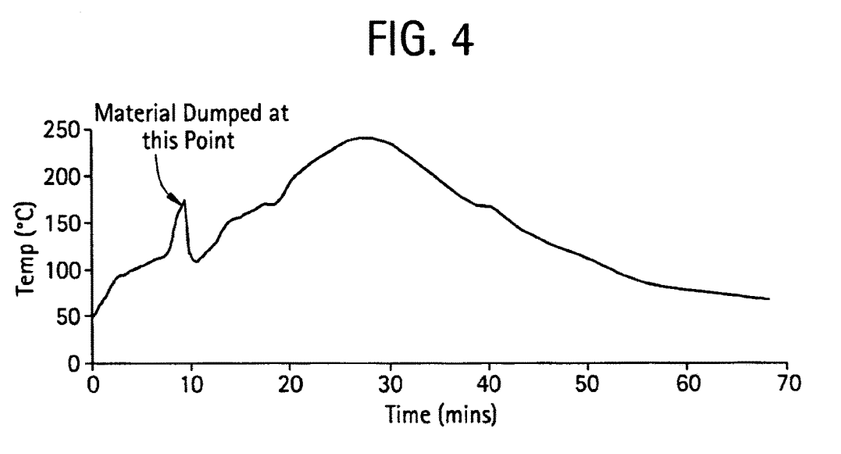
Figure 5:
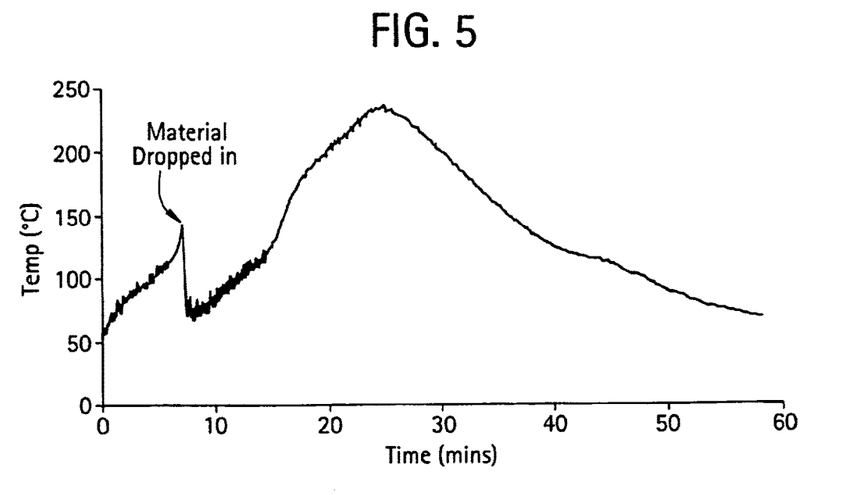

A PIAT of 243° C. was achieved and the cycle was completed in 68.12 minutes. The rotolog trace is shown in FIG. 4. The bond between the two layers was very good over the flat surfaces. A small degree of delamination was observed at the sharp corners of the mouldings where the Nylon inner layer appears to have contracted more than the polyethylene composition during cooling.

Example 5

A two skinned moulding was produced as in example 4 except that the shot weights of the polyethylene composition and of the PA-11 resin were both of 1.2 kg to produce two 2 mm layers. The PA-11 material was dropped into the moulding at 133° C. The moulding reached a PIAT of 241° C. and the cycle was completed in 45.57 minutes.

Example 6

Example 5 was repeated except that the PA-11 resin was dropped into the moulding at a temperature of 175° C. instead of 133° C. The moulding reached a PIAT of 245° C. ant the cycle was completed in 50.12 minutes.

These examples are summarised in Table I.

TABLE I

| Example | Mass PE (kg) | Mass PA-11 (kg) | PA-11 drop T (° C.) | PIAT (° C.) | Cycle time (min) |
|---|---|---|---|---|---|
| 1 | 1.8 | — | — | 212 | 36.4 |
| 2 | — | 1.8 | — | 239 | 48.9 |
| 3 | 1.8 | 1.8 | 133 | 245 | 63.7 |
| 4 | 1.8 | 1.8 | 170 | 243 | 68.2 |
| 5 | 1.2 | 1.2 | 133 | 241 | 45.6 |
| 6 | 1.2 | 1.2 | 175 | 245 | 50.1 |

For all the two skinned mouldings prepared according to the present invention, the adhesion between the polyethylene layer and the polyamide layer was excellent on flat surfaces. A minor amount of delamination was observed at the sharp angles in some of the tests.

Example 7

A two skinned moulding was produced as follows:
a shot weight of 1.8 kg of a pure polyethylene prepared with bis(n-butyl-cyclopentadienyl) zirconium dichloride and having a density of 0.934 g/cm$^3$ and a melt flow index MI2 of 8.0 g/10 min was first dropped in the mould to constitute the outer layer;
a shot weight of 1.8 kg of a pure metallocene-produced isotactic polypropylene (miPP) prepared with a bis-indenyl metallocene catalyst system and having a melt flow index MI2 of 15 g/10 min, was dropped in at a temperature of 133° C. to produce the inner layer.

A PIAT of 245° C. was achieved and the cycle was completed in 63.7 minutes. The bond between the two layers was very good and no delamination was observed even though no functionalised polyolefin was used.

Comparative Example

Figure 6:
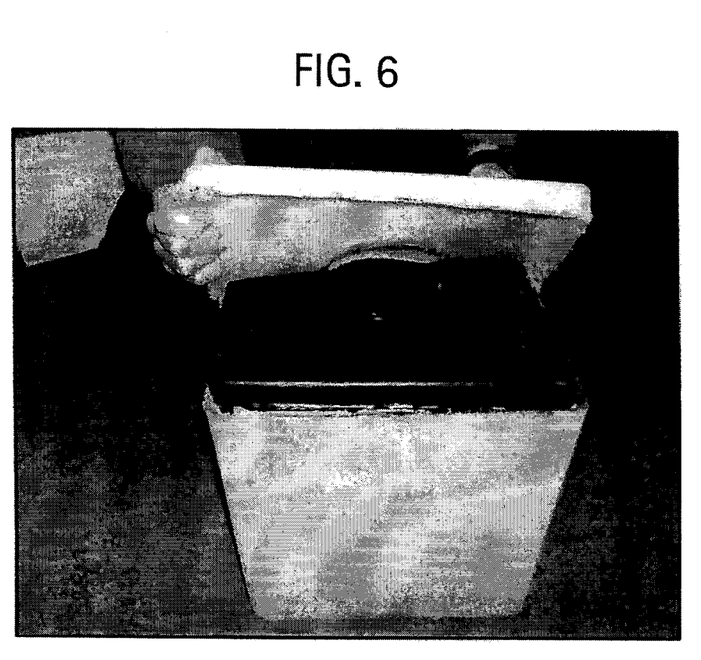
FIG. 6 represents a two-skinned rotomoulded tank having an outer layer prepared from pure mPE and an inner layer prepared from PA-11.

A two-skinned rotomoulded article was prepared under the same conditions as those of examples 1 to 7. The outer layer was a pure polyethylene prepared with ethylene-bis (tetrahydro-indenyl) zirconium dichloride and having a density of 0.934 g/cc and a melt index MI2 of 8 dg/min and the inner layer was PA-11. The finished article showed no adhesion at all between the two layers as can be seen in FIG. 6 representing a two-skinned rotomoulded tank having an outer layer prepared from pure PE and an inner layer prepared from PA-11.

Example 8

A double skinned article was prepared from 1.8 kg of a blend comprising 85 wt % of polyethylene prepared with ethylene-bis(tetrahydro-indenyl) zirconium dichloride and 15 wt % of OREVAC® and 1.8 kg of PA-11. PA-11 was dropped at a temperature of 150° C. and a PIAT of 219° C. was achieved. Forced air was used to cool the system from the starting temperature down to a temperature of 170° C., followed by water spray cooling at level 3 (18 litres/min) down to room temperature.

Examples 9, 10 and 11

Example 8 was repeated except that water spray cooling was used from the start of cooling respectively at level 1 (6 litre/min) for example 9, at level 2 (12 litres/min) for example 10 and at level 3 (18 litres/min) for example 11.

The PIAT and shrinkage results are summarised in Table II.

TABLE II

| Example | PIAT ° C. | shrinkage % |
|---|---|---|
| 8 | 219 | 1.57 |
| 9 | 214 | 1.67 |
| 10 | 216 | 1.65 |
| 11 | 216 | 1.87 |

In these examples, the layers all showed excellent adhesion to one another and could not be separated by hand. Examples 8 and 9 however showed some slight shrinkage voids at the sharp corners of the finished product thereby indicating the importance of the cooling rate. Adequate mould design can also reduce the amount of shrinkage voids.

Example 12

Two rotomoulded articles having a wall thickness of 6 mm were prepared. The first article had a 6 mm thick single layer and was prepared from polyethylene alone and cooled down with forced air. The cycle time was of 58 minutes. The second article had a 3 mm thick external layer prepared from the same PE as the other article and a 3 mm thick internal layer prepared from PA-11 and it was cooled down with water spray. The cycle time was of 42 minutes, therefore much shorter than that of the single layer article cooled down with forced air. The use of water spray to cool down the system was thus observed to be very beneficial for reducing the cycle time. Additionally, it was observed that the dimensional properties were essentially the same for one or two-layer articles: the shrinkage for both articles was of from 1.5 to 2%.

Example 13

Micropellets of PA-11 have been successfully obtained from normal pellets (3.2 mm) with the Gala underwater system called Brabender/Leistritz/Maag/A5 PAC/TWS. It consists in a twin-screw extruder with A5 PAC 6 pelletiser, a gear pump and a molten polymer filtration.

The experimental conditions were the as follows:
1) Conditions A:
   screw speed: 180 rpm,
   melt temperature: 250° C.,
   feed rate: 100 kg/h,
   pelletizer speed: 4650 rpm,
   24 holes of 0.8 mm diameter.
2) Conditions B:
   screw speed: 180 rpm,
   melt temperature: 250° C.,
   feed rate: 100 kg/h,
   pelletizer speed: 4500 rpm,
   120 holes of 0.65 mm diameter.

Figure 7:
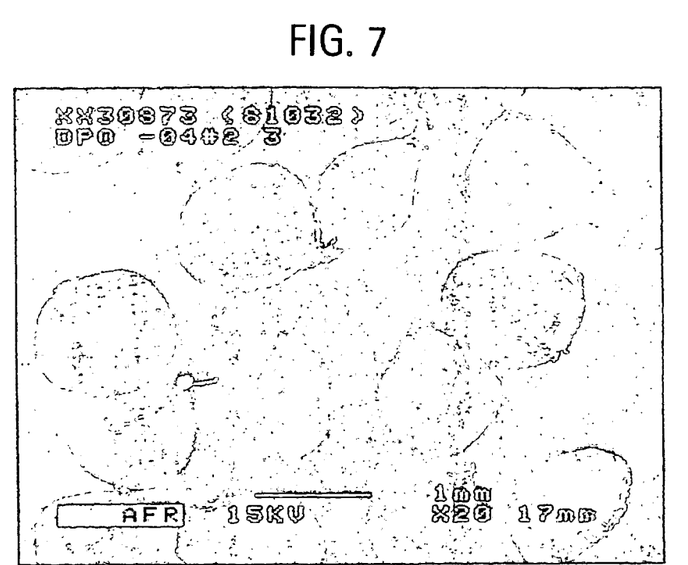
FIG. 7 represents micropellets of PA-11 resin obtained in conditions A.
Figure 8:
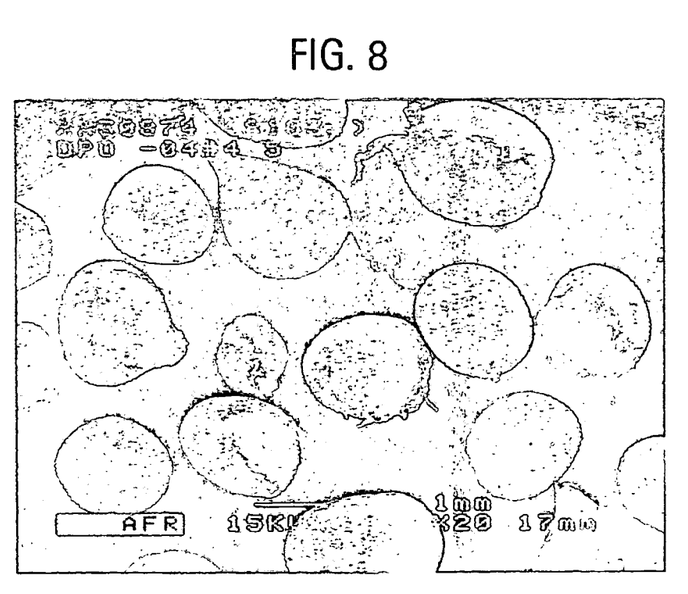
FIG. 8 represents micropellets of PA-11 resin obtained in conditions B.

The morphological features of the micropellets obtained in conditions A and B are illustrated in FIGS. 7 and 8. Average micropellet sizes were of from 1000 to 1200 μm for conditions A and of from 800 to 1000 μm for conditions B. The corresponding sieve results are:
1) for conditions A:
   S850: 99.6%
   S600: 0.4%
2) for conditions B:
   S850: 89.4%
   S600: 10.6%

These micropellets of PA-11 were then successfully used for preparing two-layer rotomoulded articles. The external layer was produced from blends of metellocene-prepared polyethylene and OREVAC® wherein the amount of OREVAC® varied from 10 to 20 wt % and the internal layer was prepared from these micropellets of PA-11.

Some additional experiments on two-layer rotomoulding were carried out using a system wherein the polyethylene was provided under the form of a powder and the polyamide was provided as powder or as pellets wrapped in a thermoplastic bag having a melting temperature slightly higher than that of the polyethylene, but below that of the polyamide. The PE melted first, coating the walls of the mould for producing the external layer, the thermoplastic pouch then melted, releasing the PA material used for producing the internal layer.

The invention claimed is:

1. A multilayer article prepared by rotational molding comprising:
   (a) an outer layer prepared from a polyethylene composition comprising at least 40 wt. % of a first polymer component comprising a non-functionalized polyethylene and from 2 wt. % to 60 wt. % of a second polymer component wherein the second polymer component of the outer layer comprises a polyolefin (PO) grafted to a non-olefinic polymer (NPO) in the form of ((PO)g-NPO) and wherein the second polymer component comprises a functionalized polyethylene having reactive functional units with acid functions or corresponding salt or ester functions or with maleic anhydride functions; and
   (b) an inner layer prepared from a composition comprising a polyamide, wherein the polyamide is present in an amount ranging from 75 to 100 wt % of said composition of the inner layer, wherein the melting point of the polyethylene composition is at least 15° C. lower than the melting point of the polyamide, wherein the melting point of the polyethylene composition is less than 145° C., and wherein the melting point of the polyamide is at least 145° C.

2. The multilayer article of claim 1, wherein the ((PO)g-NPO) is polyolefin grafted to polyamide.

* * * * *